United States Patent [19]
Goto

[11] Patent Number: 5,479,591
[45] Date of Patent: Dec. 26, 1995

[54] METHOD AND APPARATUS FOR DISPLAYING AND CUTTING OUT REGION OF INTEREST FROM PICTURE

[75] Inventor: Yoshihiro Goto, Tokyo, Japan

[73] Assignee: Hitachi Medical Corporation, Tokyo, Japan

[21] Appl. No.: 186,546

[22] Filed: Jan. 26, 1994

Related U.S. Application Data

[63] Continuation of Ser. No. 538,651, Jun. 15, 1990, Pat. No. 5,341,465.

[30] Foreign Application Priority Data

Jun. 19, 1989 [JP] Japan ................................ 1-154619

[51] Int. Cl.⁶ .................................................. G06T 3/00
[52] U.S. Cl. ............................ 395/134; 395/133; 395/155; 395/161
[58] Field of Search .................................... 395/133–139, 395/140–143, 124, 155–161; 364/413.13, 413.16, 413.18, 413.19, 413.22

[56] References Cited

U.S. PATENT DOCUMENTS 4,882,679  11/1989  Toy et al. ........................ 364/413.22

*Primary Examiner*—Almis R. Jankus
*Attorney, Agent, or Firm*—Antonelli, Terry, Stout & Kraus

[57] ABSTRACT

A method of displaying and cutting out a region of interest. Upon depicting contour lines indicating regions of interest, respectively, on a display screen, the regions of interest are displayed with contour lines differing from one region to another in accordance with the order in which the regions of interest are designated. The contour displayed is scanned in the four directions leftward, rightward, upward and downward. For the inaccessible regions which are located outside of the contour and which could not have been reached by the scanning line, one of the upward and downward scannings and one of the leftward and rightward scannings are repeated until the inaccessible regions are no longer present.

16 Claims, 10 Drawing Sheets

|  | STANDARD DEVIATION | MAXIMUM | MINIMUM | NUMBER OF PIXELS | AVERAGE |
|---|---|---|---|---|---|
| EXAMPLE (1) | 10 | 1300 | 500 | 13510 | 980 |
| EXAMPLE (2) | 35 | 1230 | 950 | 11850 | 1130 |
| EXAMPLE (3) | 18 | 100 | 5 | 13000 | 55 |

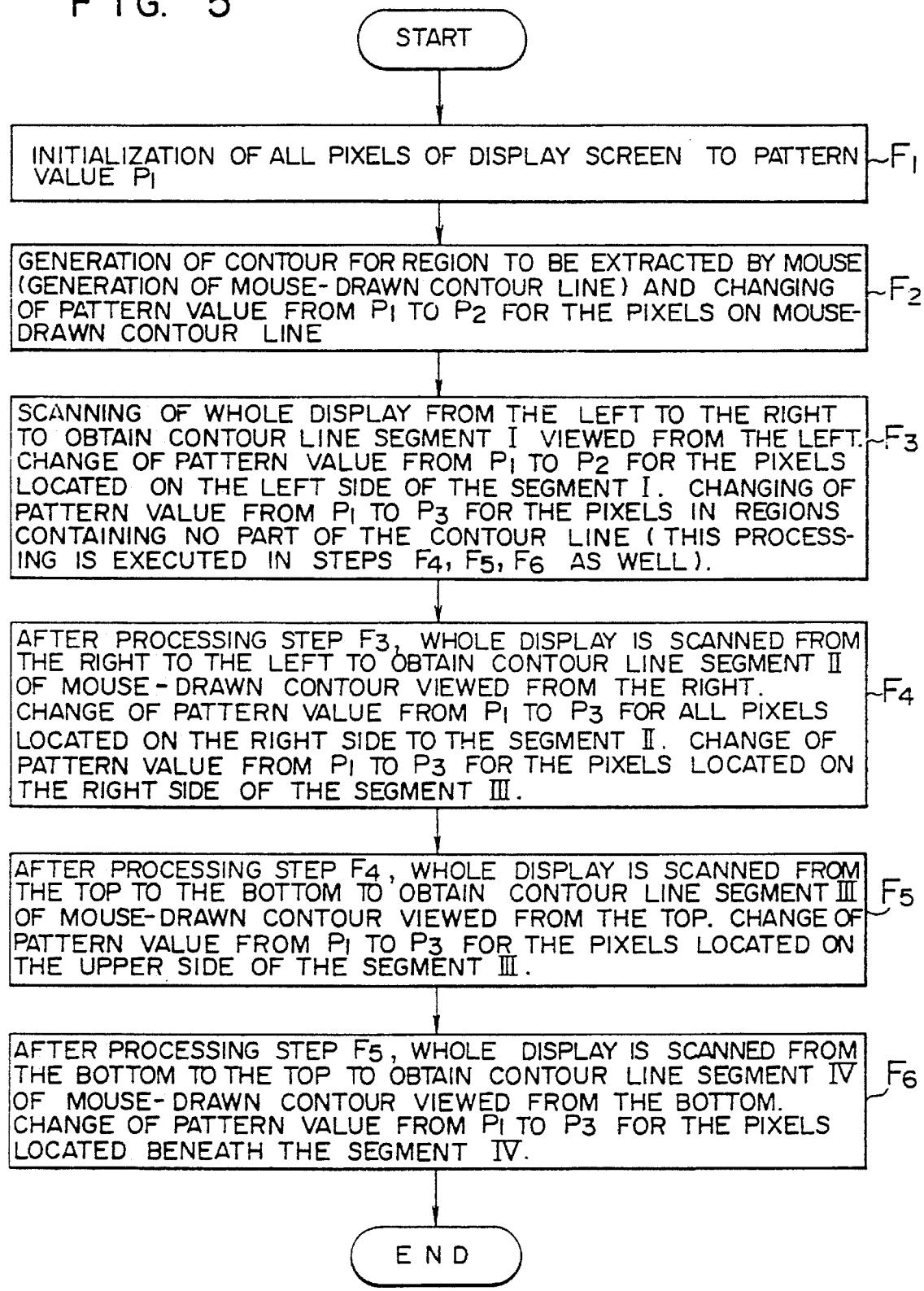

5,479,591

1

METHOD AND APPARATUS FOR DISPLAYING AND CUTTING OUT REGION OF INTEREST FROM PICTURE

This application is a continuation of application Ser. No. 07/538,651, filed Jun. 15, 1990, now U.S. Pat. No. 5,341, 465.

BACKGROUND OF THE INVENTION

The present invention relates to a method of displaying regions of interest (ROI) of a picture, a method of cutting out a region from the picture and an apparatus for carrying out these methods.

According to a typical one of the methods known heretofore for establishing a region of interest on a picture, a region designating device such as a mouse or the like is employed for marking the region of interest on the picture. In the case where there are present a plurality of regions of interest on a picture, the ordinal numbers indicating the sequence in which the regions of interest are designated are displayed in the vicinity of the regions of interest in one-to-one correspondence for the purpose of distinctively specifying the regions of interest. In FIG. 1 of the accompanying drawings, there are shown two regions of interest on a medical picture. Referring to the figure, when a region 2A indicated by a broken line is designated in a picture 2 generated on a display screen 1, the ordinal number "1" indicating its turn in the sequence of designation is displayed in the vicinity of the region 2A. Subsequent designation of a region 2B indicated also by a broken line in FIG. 1 is accompanied with the display of the ordinal number "2" in the vicinity of the region 2B.

According to a second one of the methods known heretofore, a region of interest is prepared independently of a picture, wherein a region of the picture which coincides with the region of interest is cut out. More particularly, referring to FIG. 2A of the accompanying drawings, a region of interest on a picture is first designated by means of an indicating device such as a mouse or the like while viewing the picture, whereby the region of interest is prepared as a figure or contour such as a line diagram 3A (hereinafter referred to as the mouse-drawn contour or diagram or figure or the like). Next, a circumscribing line 3B is generated for the mouse-drawn contour 3A. This can be accomplished by a computer.

In the generation of the circumscribing line 3B, a circle of a radius r having the center at a point 3b located near the mouse-drawn contour 3A is designated. When at least a point 3a on the mouse-drawn contour 3A exists within the circle, then the point 3b is regarded as a point which constitutes a part of the circumscribing line 3B. Next, after moving to a point disposed a predetermined distance from the point 3b in the direction indicated by an arrow in FIG. 2B, a similar procedure is repeated. In this manner, the circumscribing line 3B for the mouse-drawn contour 3A is generated. Parenthetically, the circle of the radius r may be represented by a matrix of 3×3 pixels, for example, in the case of a digital picture.

By making use of the mouse-drawn contour diagram 3A and the circumscribing line diagram 3B, a region of interest is cut out from the real picture.

The first mentioned prior art method is certainly advantageous whereby the operator that can easily specify the region of interest by virtue of the ordinal numbers affixed to the regions. However, a disadvantage of this prior art method can be seen in that portions of the picture located closely to the affixed numbers are difficult to view.

2

The second mentioned prior art method is notable in that memories for storing the line diagrams (i.e. the mouse-drawn contour diagram and the circumscribing line diagram) are prepared separately for cutting out a region from a picture. This method however suffers in that the procedure for preparing the circumscribing line diagram is required and that not only the circumscribing line diagram but also the mouse-drawn contour diagram has to be used for cutting out the region of interest from the picture. Besides, in the case of the second mentioned method, it is required to identify discriminatively the portions located inside and outside of the mouse-drawn contour, the procedure for which however is extremely complicated to its disadvantage.

SUMMARY OF THE INVENTION

It is an object of the present invention to provide a method of displaying a region or regions of interest of a picture, a method of cutting out the region of interest and an apparatus for carrying out these methods in which the regions of interest can be specified without resorting to the use of identification numbers and in which a contour diagram for cutting out the region of interest can be generated without using the circumscribing line diagram.

According to the present invention, it is contemplated to discriminantly identify the regions of interest with the aid of the attributes of contour lines thereof. With the phrase "attributes of the contour line", it is intended to mean the types or species of the line (such as a solid line, a broken line, a single-dot phantom line, a double-dot phantom line, a solid line, a thin line, densities and colors of the line and the like).

According to an aspect of the invention, it is proposed that all the pixels of the whole display screen are at first initialized to zero or to specific characters "A" uniformly or in a specific pattern (referred to as the pattern having a pattern value of "$P_1$"), by way of example, whereas the pixels on the line of the mouse-drawn contour are set to a value differing from the above-mentioned initial pattern value such as exemplified by "$P_2$". In the following description, it is assumed that all the pixels are initialized to the initial pattern value "$P_1$" for the convenience of discussion. The contour diagram thus generated is then scanned in the four directions, i.e. from the left to the right, from the right to the left, from the top to the bottom and from the bottom to the top, respectively, whereupon encountering the first pixel of a pattern value "$P_2$" different from "$P_1$" on the mouse-drawn contour line in the course of scanning in a given one of the above-mentioned directions, that scan is then terminated to start the scan along the next scanning line. The area enclosed by the pixels "$P_2$" thus obtained can then be specified as the region to be cut out. In this manner, all the pixels located within the region to be cut out may be changed in respect to the pattern value thereof from "$P_1$" to "$P_3$" or, alternatively, the pattern value of all the pixels within the region to be cut out may remain the same with all of the pixels located outside of the region being changed from "$P_1$" to "$P_3$". In any case, the regions located inside and outside of the mouse-drawn contour line can be discriminated with the different pattern values of the pixels. Thus, there is realized a contour line for cutting out the region of interest. There may appear a mouse-drawn contour of such a complicated shape that makes it difficult to discriminate the portions located inside and outside of the mouse-drawn contour. To deal with such a complicated mouse-drawn contour, it is proposed according to another aspect of the invention that, after the contour line for cutting out the region of interest has been obtained, unique processing is performed in an effort to correctly distinguish the portions located outside and inside of the mouse-drawn contour. In this manner, the mouse-drawn contour of a complicated shape may be such as exemplified in FIG. 2A and have deep recesses of intricate shapes as designated by 3c and 3d. According to the unique processing taught by the invention, these contour portions 3c and 3d are compared with patterns prepared previously for the purpose of collation to thereby differentiate the inside and outside regions from each other, in view of the fact that the contour portions 3c and 3d are difficult to identify by the scanning in the four directions mentioned above.

By virtue of the feature of the invention that the order or sequence in which the regions of interest have been designated can be recognized with the aid of the attributes of the contour lines, any particular region of interest can easily be identified or selected.

Furthermore, owing to the scan processing performed conveniently in the four directions for discriminating the regions located outside and inside of the contour line for cutting out the region of interest, the processing time can be reduced significantly as compared with the prior art processing.

Further still, even the contour portion of a complicated shape which renders it impossible or difficult to discriminantly identify the regions located outside and inside thereof from each other through the scanning in the four directions can be defined through the additional processing performed by making use of the collation patterns.

BRIEF DESCRIPTION OF THE DRAWINGS

FIG. 5 is a flow chart for illustrating a first extraction processing;

DESCRIPTION OF THE PREFERRED EMBODIMENTS

Figure 1:
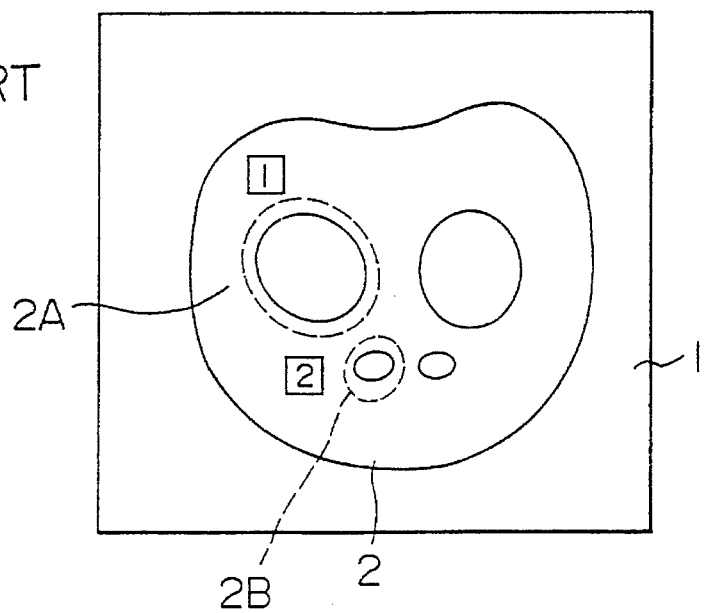
FIGS. 1, 2A and 2B are views for illustrating the prior art method of displaying and cutting out a region of interest from a picture.
Figure 2A:
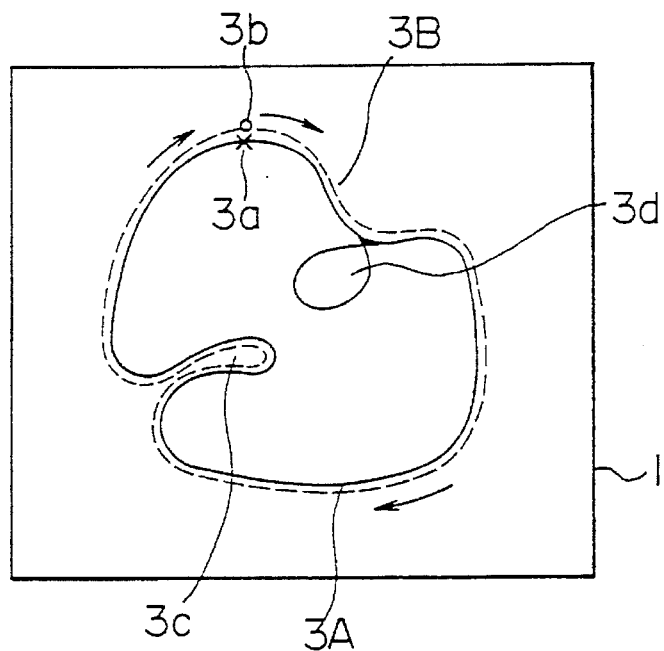
Figure 2B:
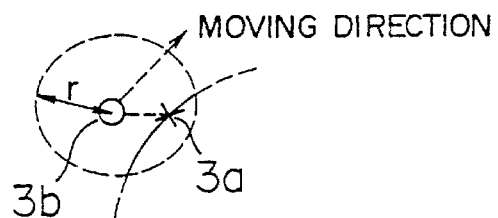
Figure 3:
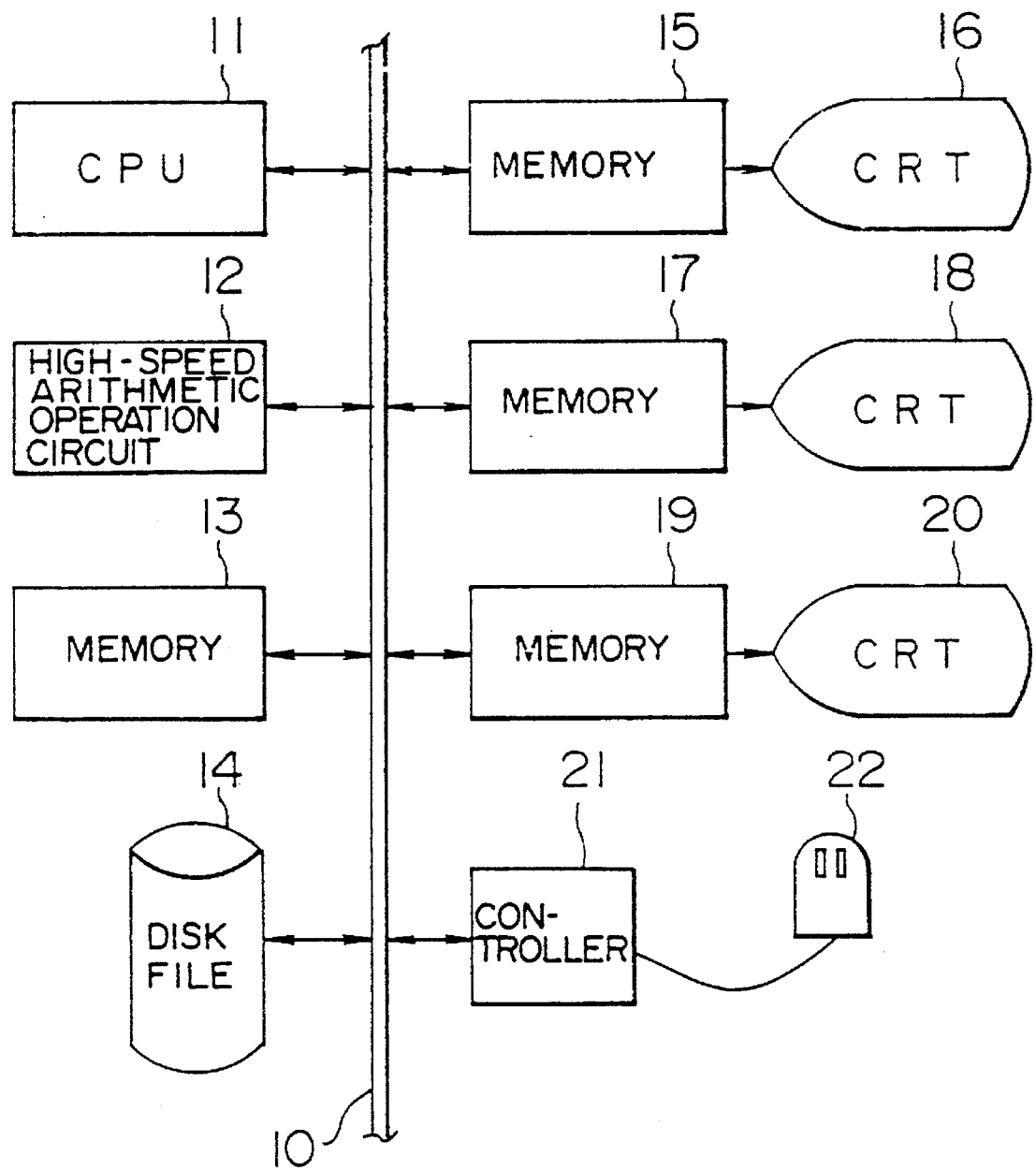
FIG. 3 is a schematic block diagram showing a general arrangement of an apparatus according to an embodiment of the present invention.

FIG. 3 is a schematic block diagram showing a general arrangement of an image processing system according to a preferred or exemplary embodiment of the invention. As can be seen in the figure, there are connected in parallel to a bus 10, a central processing unit or CPU 11, a high-speed arithmetic operation circuit 12, a memory 13, a disk file 14, memories 15, 17 and 19 and a controller 21. Cathode-ray-tube or CRT displays 16, 18 and 20 are connected as terminals to the memories 15, 17 and 19, respectively. A mouse 22 is connected to the controller 21 as a terminal.

The CPU 11 is responsible for management or control of the whole system as for well as for image processing. Programs for this end are stored in the memory 13 which additionally stores various data inclusive of those for the work areas. The disk file 14 stores various data bases and various data (including picture or image data).

The memories 15, 17 and 19 are provided distinctively from one another as a character display memory, a mouse-drawn contour display memory and a picture display memory, respectively. The CRTs 16, 18 and 20 are provided for displaying different pictures. By way of example, the CRT 16 is provided for displaying a medical picture or image, the CRT 18 is for displaying a mouse-drawn contour diagram and the CRT 20 is for displaying a region of interest to be cut out from the medical picture with the aid of the mouse-drawn contour diagram. It should however be mentioned that the various display functions mentioned above may be performed solely with the CRT 16. In that case, the other CRTs 18 and 20 may be employed for other purposes or uses.

The mouse 22 is used for inputting a mouse-drawn contour by way of the controller 21 under command of operator, whereby the contour diagram is displayed on the CRT 18 in the case of the illustrated embodiment of the invention.

A new or novel part of the illustrated system resides in the high-speed arithmetic operation circuit 12. This circuit is constituted by a dedicated hardware (or firmware in more strictive sense) which includes a read-only memory or ROM, an arithmetic unit and a memory. Contents of the processing are designated by a microprogram stored in the ROM. The arithmetic unit performs the processing in accordance with the contents of the processing stored in the ROM to thereby designate finally a region of interest by making use of read/write operations performed in the memory.

There are two types of processings to be executed by the microprogram. The first is a processing for discriminantly determining the order or sequence of designations of regions of interest by making use of the attributes of the contour lines. In this manner, it is to be noted that there is previously programmed in the ROM what types or species of lines are to be used for displaying the regions of interest in accordance with the order or sequence in which the regions of interest are to be designated. However, since this processing is simple, it may alternatively be performed by the CPU 11.

The second is a four-directional scan processing for discriminantly identifying the portions located inside and outside of the mouse-drawn contour line and a subsequent processing. This second processing is simple in its nature. However, in view of the fact the same steps are executed repeatedly many times, this second processing is profitably suited to be performed by firmware with a microprogram which is software having a close affinity to the hardware. The contents of the second processing will hereinafter be described in greater detail.

Figures 4A, 4B:
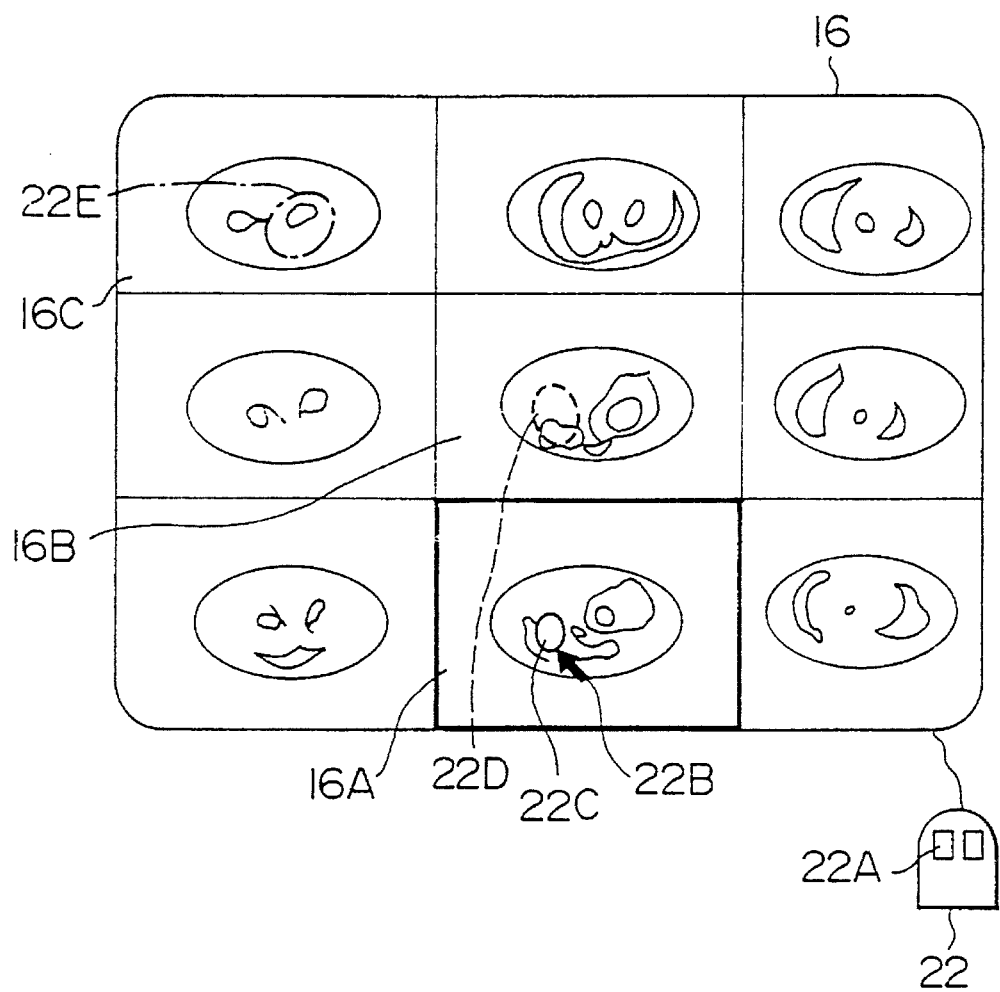
FIGS. 4A and 4B are views for illustrating a method of displaying regions of interest on pictures according to an exemplary embodiment of the invention.

FIG. 4A is a view showing examples of the regions of interest designated sequentially by making use of the attributes of the contour lines. The whole display screen area of the CRT 16 is divided into nine subareas in a matrix array of 3 rows and 3 columns (a sort of windowing fixed or variable) such that the mouse-drawn contour can be generated in any of the subareas by using the mouse 22. Further, it is contemplated that different pictures are displayed separately and individually in the nine subareas and that the mouse-drawn contours can be generated independently of one another.

Now, it is assumed that a picture 16A is specified, a mouse-drawn contour indicating a region of interest is designated in the picture 16A, and that a certain statistic processing is to be performed on a medical picture within the contoured region.

First, the procedure for designating a region of interest in a picture displayed in the subarea 16A is started, wherein a boundary (a rectangle in a thick solid line) for the subarea 16A is automatically displayed. Once the boundary has thus been established, the object for the processing is limited to the picture displayed on the subarea 16A. An arrow marker 22B interlocked with the mouse 22 can be moved only within the subarea 16A and is prevented from moving to any of the other subareas. Of course, the boundary line may be drawn by manually operating the mouse 22 correspondingly. To this end, the boundary line may be drawn with the mouse while depressing a button 22A.

After generation of the boundary line, a marker 22B is moved by manipulating the mouse 22B to thereby designate a region of interest 22C indicated by a thick solid contour line. The thick solid contour line displayed indicates the region of the picture designated first with the mouse 22.

In succession to the display of the thick solid contour line, statistic processing of the density of the picture region enclosed by the contour line is performed, the results of which is shown in FIG. 4B, only by way of example. More specifically, referring to FIG. 4B, there are shown in the row labeled "Example 1" the results of the static processing concerning a standard deviation, a maximum value, a minimum value, the number of pixels and mean value.

Through the similar procedure, the subarea 16B is selected, wherein a region 22D of interest is designated. Since this is the second designation of the region of interest, the latter is indicated by a broken line. Further, as a third designation of the region of interest, the subareas 16C is designated, wherein a region 22E of interest is indicated by a single-dot phantom line. In this manner, the order of the first to third designations can be shown by the solid line, the broken line and the single-dot phantom line, respectively. In FIG. 4B, examples of the statistic processing for the regions of interest 22C, 22D and 22E are shown at (1), (2) and (3), respectively.

According to the instant embodiment of the invention, the regions of interest can be displayed by changing the type or species of the contour line for every region of interest, whereby they can be easily specified or discriminantly identified. In particular, it is noted that discriminative identification of the pictures is facilitated for the operator. In the case of a color CRT display, the regions of interest may be discriminantly indicated by changing the colors of the mouse-drawn contour lines.

Figure 6:
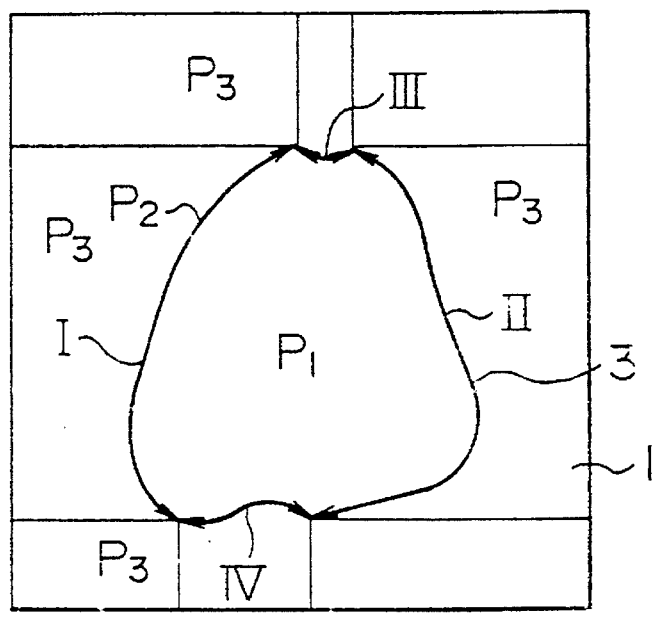
FIGS. 6 and 7 are views for illustrating in more detail the processing shown in FIG. 5.
Figure 7:
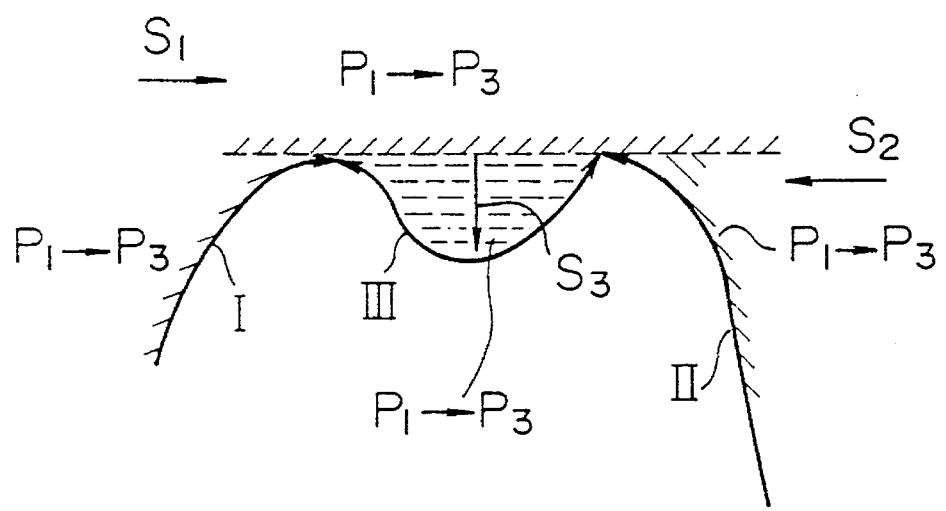

FIG. 5 shows a first processing flow chart for extracting a picture to be cut out from a region delimited by the mouse-drawn contour line according to another embodiment of the invention, while FIG. 6 and FIG. 7 illustrate concrete examples of the extraction from the memory. Referring to FIG. 5, all the pixels (picture elements) of the display screen are at first initialized. By way of example, all the pixels are set to a pattern value $P_1$ (step $F_1$). Next, a mouse-drawn contour line for cutting out a region of interest is generated with the pixels on the contour line being changed from the pattern value of $P_1$ to $P_2$. Thus, the mouse-drawn contour line is specified (step $F_2$).

After having specified the mouse-drawn contour, processing steps $F_3$ to $F_6$ are executed. In FIG. 5, there are shown in the step blocks $F_3$ to $F_6$ the contents of processing by scanning from the left toward the right, scanning from the right toward the left, scanning from the top toward the bottom and scanning from the bottom toward the top. When the pixel of the pattern value $P_2$ is detected on the mouse-drawn contour line in the course of scanning, then the scan is terminated, and the next scan is initiated. As the result of this processing, the pixels belonging to the contour line segments I to IV, as well as those located outside of these line segments, are changed from the pattern value of $P_1$ to $P_3$.

More specifically, referring to FIG. 6, the contour line segment I is first obtained by scanning the mouse-drawn contour diagram 3 from the left-hand side. Thereafter, the contour line segment II can be extracted by scanning the mouse-drawn contour diagram in the direction from the right to the left. Subsequently, the mouse-drawn contour diagram is scanned from the top toward the bottom to thereby extract the contour line segment III. Finally, the contour segment IV is extracted through the scanning from the bottom toward the top. The contour line segment III can not be extracted either by the scanning from the left to the right or the scanning from the right to the left but can be extracted only by the scanning from the top to the bottom. Similarly, the contour line segment IV can not be extracted through the scannings in the three directions from the left to the right, from the right to the left or from the top to the bottom, but can only be extracted by the scanning in the direction from the bottom to the top.

FIG. 7 illustrates, by way of example, extraction of the contour line segment III. From the figure, it will be seen that the contour segment III can be detected only by the scanning $S_3$ in the direction from the top toward the bottom and can not be detected either by the scanning $S_1$ in the direction from the left to the right or by the scanning $S_2$ from the right to the left.

Next, an example of extracting a contour line segment from a mouse-drawn contour diagram of a complicated shape will be explained by referring to FIG. 8.

Figure 8:
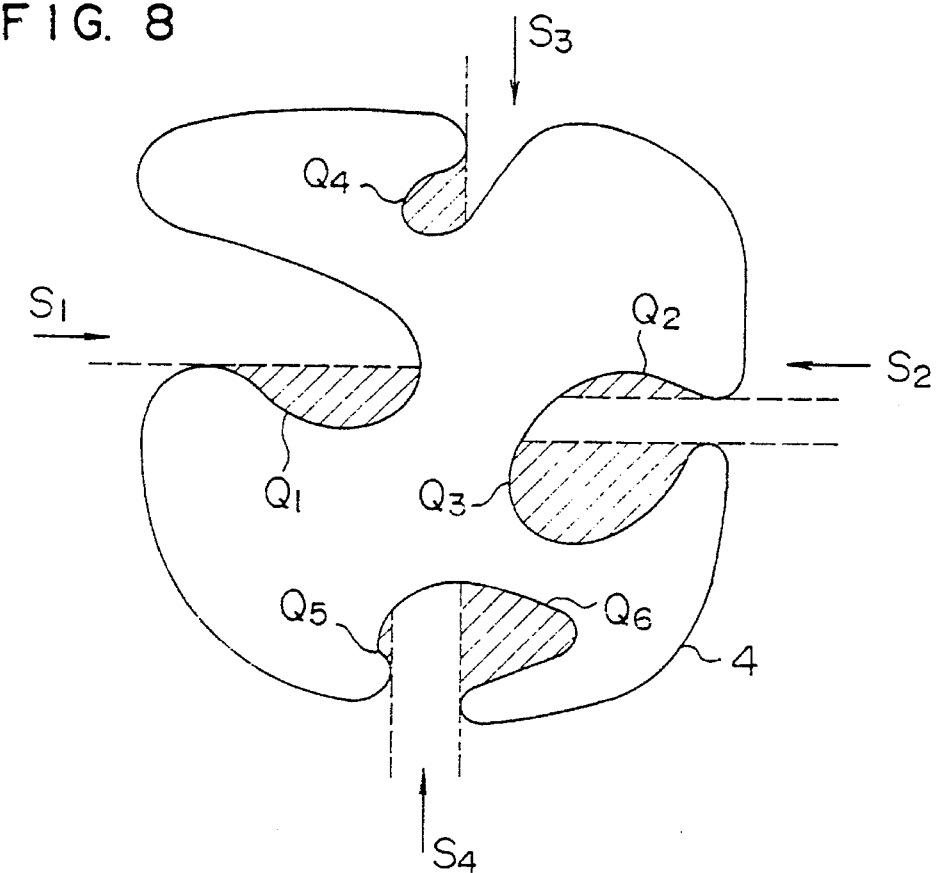
FIG. 8 is a view for illustrating inaccessible regions making appearance in the extraction processing illustrated in FIG. 5.

FIG. 8 shows a mouse-drawn contour diagram of an intricate shape having a number of deep recesses. As will be seen in the figure, contour line segments $Q_1$ to $Q_6$ remain undetected with the pixels thereon being left with the pattern value of $P_1$ even after the scannings in the four-directions mentioned above. This means that the pixels of the pattern value $P_1$ existing on the segments $Q_1$ to $Q_6$ are regarded as being located inside of the region to be cut out, resulting in a defective cut-out picture.

Accordingly, for the inaccessible regions which could not be reached by the scanning in the four directions, two additional scannings in the directions from the left to the right and from the top to the bottom are performed for the mouse-drawn diagram obtained through the processing shown in FIG. 5. For these additional scannings, collation patterns for allowing the inside and the outside of the mouse-drawn contour line to be discriminated are previously prepared for identifying whether a pixel of concern is located outside or inside of the mouse-drawn contour line by determining whether or not the pixel of concern belongs to the collation pattern. It should be added that the two additional scannings mentioned above may be effected in the directions from the right to the left and from the bottom to the top.

The relationship between the collation patterns and the inside/outside discriminations are listed in the following table 1.

TABLE 1

| Type | Pattern | Results of collation |
|------|---------|----------------------|
| (a)  | $P_2$-($P_1 \sim P_1$)-$P_3$ | ($P_1 \sim P_1$) is changed to $P_3$ |
| (b)  | $P_2$-($P_1 \sim P_1$)-$P_2$ | ($P_1 \sim P_1$) is left unchanged |
| (c)  | $P_3$-($P_1 \sim P_1$)-$P_2$ | ($P_1 \sim P_1$) is changed to $P_3$ |

In the above table, ($P_1 \sim P_1$) represents a succession of the pixels of the pattern value $P_1$ inclusive of the single existence of the pixel of $P_1$. The collation patterns can be applied in common to the scanning $S_1$ in the direction from the left to the right and the scanning $S_3$ from the top to the bottom. In the case of the scanning $S_1$ from the left-hand side, the pattern of type (a) represents a region in which the pixel of $P_2$ (the pixel on the mouse-drawn contour) is located at the leftmost end, being followed by a succession of the pixels of $P_1$ and then the pixel of $P_3$ at the rightmost end. In the case of the scanning from the top to the bottom, the pattern of type (a) represents a region in which the pixel of $P_2$ exists at the top, which is followed by a succession of the pixels of $P_1$ and then the pixel of $P_3$ at the bottom.

Regions represented by the patterns of type (b) and (c) can be defined similarly to the pattern of type (a).

When the patterns of the types (a) and (c) are validly applied, the successive pixels of ($P_1 \sim P_1$) are all changed to $P_3$. When the pattern of type (b) is validly applied, the pixels of ($P_1 \sim P_1$) are left as they are.

Figure 9A:
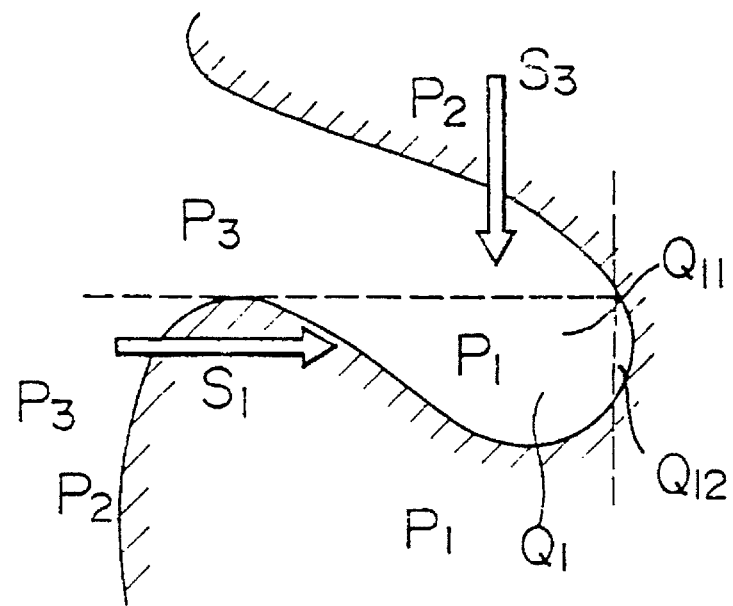
FIGS. 9A and 9B are views for illustrating how to process the inaccessible region.

More specifically, reference is made to FIG. 9A which shows, by way of example, an inaccessible region $Q_1 (=Q_{11}+Q_{12})$ which could not be reached in the first extraction processing and is left as it is. In the second scanning $S_1$ in the direction from the left to the right, the pixels on the scanning line within the region $Q_1$ are in the pattern of $P_2$–($P_1 \sim P_1$)–$P_2$. This corresponds to the collation pattern of type (b) listed in the table 1. Accordingly, the pixels of ($P_1 \sim P_1$) are left as they are.

On the other hand, in the second scanning $S_3$ in the direction from the top to the bottom, the pixels on the individual scanning lines within the region $Q_{11}$ assume a pattern of $P_3$–($P_1 \sim P_1$)–$P_2$ which coincides with the pattern type (c) in the table 1. Accordingly, all the pixels of $P_1$ within the region $Q_{11}$ are changed from $P_1$ to $P_3$.

In the scanning $S_3$ from the top to the bottom, the pixels within the remaining subregion $Q_{12}$ of region $Q_1$ are in a pattern of $P_2$–($P_1 \sim P_1$)–$P_2$. Thus, the pixels corresponding to ($P_1 \sim P_1$) remain as they are, without being processed.

Figure 9B:
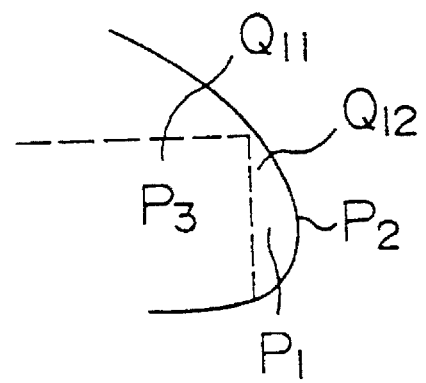

Now, the scannings $S_1$ and $S_3$ are performed once again. In the scanning $S_1$, the pixels are in the state as illustrated in FIG. 9B, wherein the pixels in the region $Q_{11}$ are changed to $P_3$ through the preceding scan processing $S_3$. Accordingly, the scanning $S_1$ within the region $Q_{12}$ results in a pixel pattern of $P_3$–($P_1 \sim P_1$)–$P_2$ which coincides with the pattern type (c) in the table 1. Accordingly, all the pixels of ($P_1 \sim P_1$) are changed to $P_3$.

In the succeeding scan $S_3$, there exist no pixels which are to be changed from $P_1$ to $P_3$. Accordingly, the scanning $S_3$ at this time results in no change of $P_1$ to $P_3$.

Parenthetically, it is sufficient to perform the additional scan processings $S_1$ and $S_3$ only within a rectangular region circumscribing the mouse-drawn contour. In scanning the whole picture, there may arise a case in which all the pixels on the scanning lines are $P_3$ (meaning that all the pixels are located outside of the mouse-drawn contour). In that case, all the pixels of ($P_3 \sim P_3$) are left as they are.

The above description has been made in conjunction with the region $Q_1$. It should however be understood that the regions $Q_2$ and $Q_6$ (FIG. 8) are processed similarly. The additional scan processings $S_1$ and $S_3$ are repeated, respectively, until there exist no regions that could not be reached or accessed.

Figure 10:
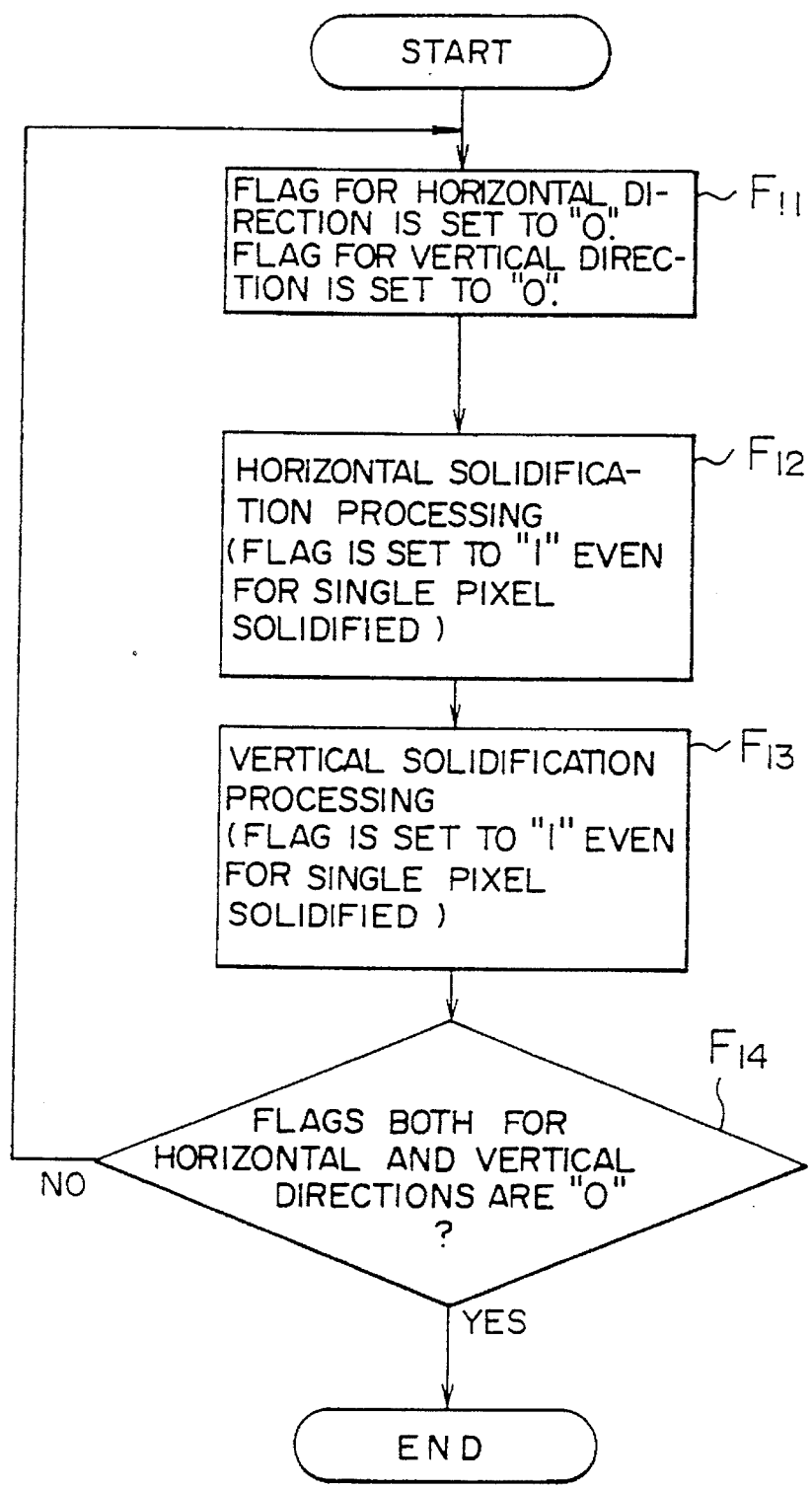
FIG. 10 is a view showing in general an additional processing flow according to another embodiment of the invention.

FIG. 10 is a flow chart outlining the additional processing. Referring to the figure, at a step $F_{11}$, a flag $D_1$ indicating the horizontal scanning (i.e. the scanning $S_1$ in the direction from the left to the right) and a flag $D_2$ indicating the vertical scanning (i.e. the scanning $S_3$ in the direction from the top to the bottom) are initialized (i.e. $D_1=0$, $D_2=0$). Needless to say, these flags $D_1$ and $D_2$ are used for determining whether or not the scan processing $S_1$ and/or $S_3$ is to be repeated.

Next, solidification processing in the horizontal direction is executed. With the phrase "solidification processing", it is intended to mean the processing for changing the pixels of ($P_1 \sim P_1$) to those of $P_3$. So far as there exists at least one pixel having the pattern value $P_1$ changed to $P_3$ within the range scanned, the flag $D_1$ is set to "1", while it is left at "0" when no change is made in the pattern value at all (step $F_{12}$).

Subsequently, the solidification processing is executed in the vertical direction. When there exists even a single pixel having the pattern value of $P_1$ changed to $P_3$, the flag $D_2$ is set to "1" and otherwise it is left as "0" (step $F_{13}$).

When the solidification processings in the horizontal and vertical directions have once been performed, it is then checked whether the flags $D_1$ and $D_2$ are "0" or not (step $F_{14}$). When $D_1$="0" with $D_2$="0", then the processing comes to an end, because further repetition of the processing can no longer bring about the change of the pattern value to $P_3$. If $D_1$="1" with $D_2$="1" or if $D_1$="1" with $D_2$="0" or if $D_1$="0" with $D_2$="1", the step $F_{11}$ is repeated because there is the possibility that the pixel of the pattern value $P_1$ may be changed to $P_3$ at the additional processing steps ($F_{11}$ to $F_{13}$). Those processings are repeated three times in the case of the example illustrated in FIGS. 9A and 9B.

Figure 12:
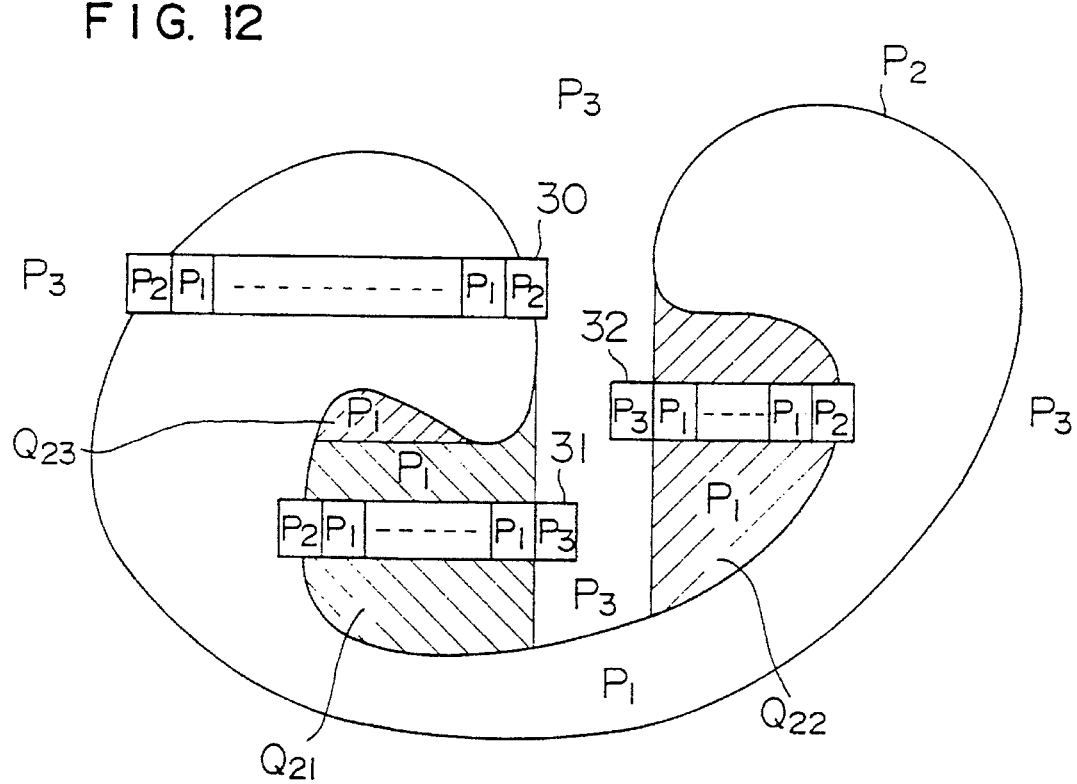
FIG. 12 is a view for illustrating the additional processing flow shown in FIG. 11.
Figure 11:
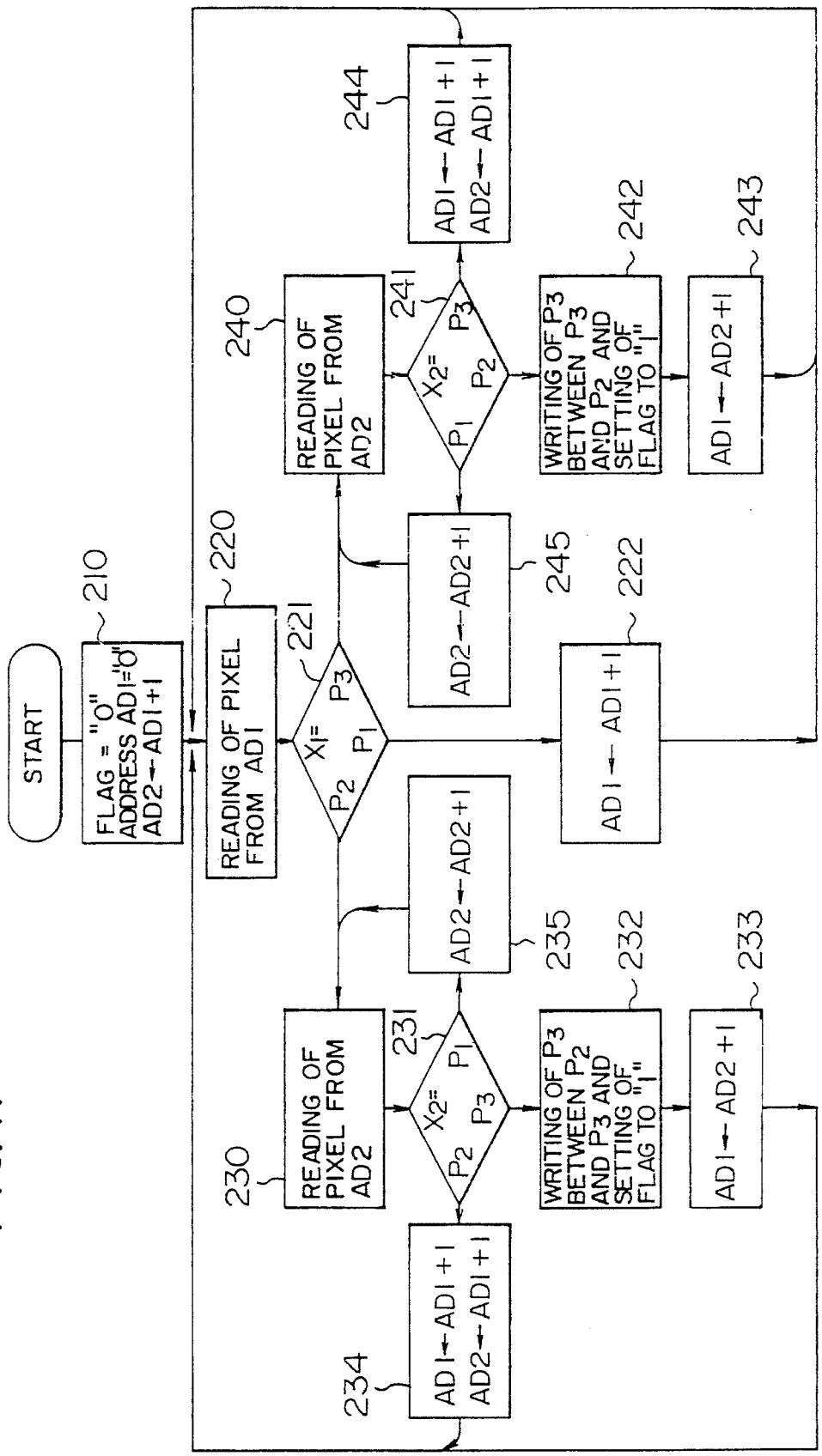
FIG. 11 is a view showing in greater detail the additional processing flow.

FIG. 11 is a flow chart illustrating in greater detail the additional horizontal processing. The term "flag" used in the flow chart means the flag $D_1$ used in the horizontal processing, and reference symbols $AD_1$ and $AD_2$ represent the addresses of the start and end pixels, respectively, of a pattern which is to be compared with the collation pattern. Further, in the following description of the processing shown in this flow chart, it is assumed that the mouse-drawn contour diagram, shown in FIG. 12 and derived from the first extraction processing, is used.

Referring to FIG. 11, the flag is "0" with $AD_1$ and $AD_2$ being "0" and "$AD_1$+1", respectively, at a step 210. Pattern comparison starts from two pixels. So far as the inaccessible region which could not be reached exists, the flag is set to "1" after the processing, while it remains "0", if otherwise. At a step 220, data is read out from the address $AD_1$. This data is represented by $X_1$. At a step 221, it is decided whether the pattern value of $X_1$ is $P_2$ or $P_3$ or alternatively $P_1$.

When $X_1=P_2$, the procedure jumps to a step 230 where data is read out from the address $AD_2$. This data is represented by $X_2$. When this data $X_2$ is of the pattern value $P_2$, there is no need for the change or replacement. At a step 234, the leading end of the pattern to be compared is shifted by one pixel by incrementing the addresses (i.e. $AD_1 \leftarrow AD_1+1$ with $AD_2 \leftarrow AD_1+1$), whereupon return is made to the step 230. When $X_2=P_1$, the address $AD_2$ is incremented by "1" at a step 235 to extend the pattern to be compared by one pixel, whereupon the step 230 is repeated. Thereafter, even when a pixel having the value $P_1$ is encountered in a pattern of $P_2P_1P_1P_2$ (such as the pattern 30 shown in FIG. 12), there is no necessity to change the pixel value. By repeating the steps 230, 231 and 235, the address $AD_2$ is sequentially shifted. When $X_2$ equal to $P_3$ is encountered at a given place in the course of the repetition (corresponding to the pattern 31 in FIG. 12), the processing procedes to a step 231 where any pixel of $P_1$ existing between the addresses $AD_1$ and $AD_2$ are replaced by $P_3$. Further, the flag is set to "1", being followed by a step 233 where the address $AD_1$ is incremented such that $AD_1 \leftarrow AD_2+1$, to thereby set the pixel next to that replaced by $P_3$ at the start address, whereon the step 233 is regained.

When it is determined at the decision step 221 that $X_1=P_1$, the address $AD_1$ is incremented by one to shift the start of the pattern for comparison by one pixel, whereupon return is made to the step 220.

On the other hand, when the decision step 221 results in that $X_1=P_3$, the procedure jumps to a step 240 at which data of $AD_2$ is read out. This data is represented by $X_2$. When $X_2=P_3$, the addresses are incremented at a step 244 such that $AD_1 \leftarrow AD_1+1$ and $AD_2 \leftarrow AD_1+1$, to thereby shift by one pixel the pattern subject to the comparison, whereupon return is made to the step 220. On the other hand, when $X_2=P_1$, the processing proceeds to a step 245 at which the address $AD_2$ is incremented, being followed by the return to the step 240. Further, when it is found at the step 241 that $X_2=P_2$ as in the case of the pattern 32 shown in FIG. 12, any pixel of $P_1$ existing between those of $AD_1$ and $AD_2$ are replaced by the pixel of $P_3$ at a step 242 and then the flag is set to "1". At a step 243, the address $AD_1$ is incremented such that $AD_1 \leftarrow AD_2+1$ to thereby set the pixel succeeding to the pixel replaced by $P_3$ at the start address, whereupon return is made to the step 220.

This first additional processing in the horizontal direction is completed when the address $AD_1$ has attained a predetermined value. (i.e. at the end of the picture).

The scan processing in the vertical direction is executed in accordance with the processing flow similar to what has been described above.

Figure 13A:
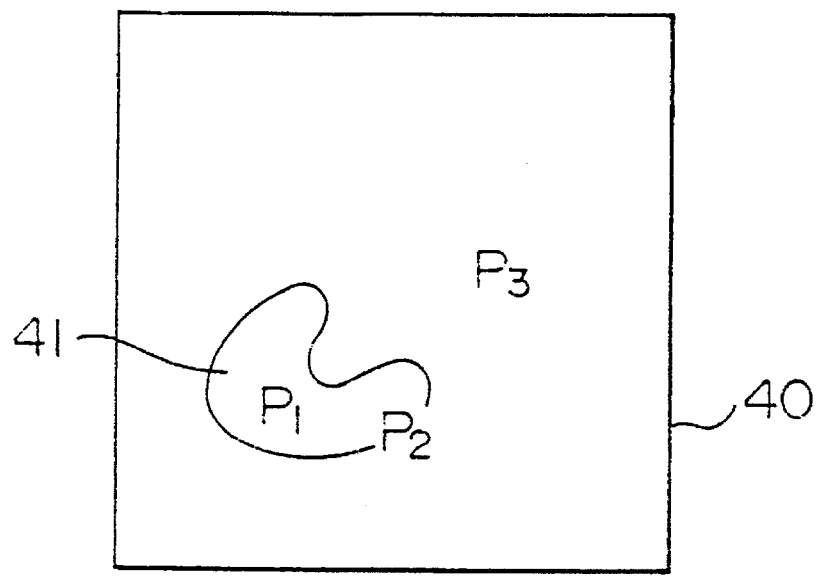
FIGS. 13A and 13B are views showing a relation between a mouse-drawn contour diagram and a picture from which a region of interest is to be cut out.
Figure 13B:
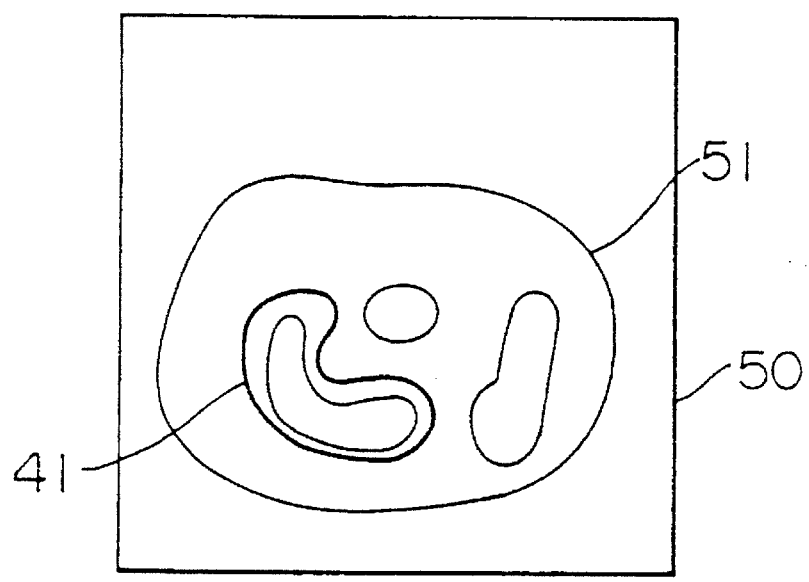

Next, by reference FIGS. 13A and 13B, description will be made of the processing for cutting out a region of interest from a picture under consideration. When a mouse-depicted contour is drawn on the image memory, the image or picture data at the corresponding memory locations will be erased. In order to evade such inconvenience, there are provided separately a memory (40 in FIG. 13A) dedicated to the storage of the mouse-drawn contour diagram and a memory (50 in FIG. 13B) for storing a picture from which the region of interest is to be cut out. The rows and columns of the memories 50 and 51 are provided in one-to-one correspondence or at a predetermined ratio. On the CRT, the pictures stored in both memories are displayed in superposition to allow a region 41 of interest to be depicted on the CRT display screen while viewing the picture 51 from which the region of interest is to be cutout.

As a result, the mouse-drawn contour 41 is recorded on the memory 40 without injuring the picture data on the image memory 50 at all.

In the actual cut-out processing, the contents of the memories 40 and 50 are compared with each other on an address basis, whereby the picture portion on the memory 50 corresponding to the mouse-drawn contour 41 is cut out.

Parenthetically, the pixels of $P_2$ on the mouse-drawn contour may be changed to the pixels of $P_1$ upon comparison, and thereafter the address-based comparison may be performed.

As an alternative, instead of displaying the mouse-drawn contour on the picture from which a region of interest is to be cut out, the former may be designated on another CRT (or a blank region of the CRT on which the picture of concern is displayed) while viewing the picture. In this case, the mouse-drawn contour is automatically written in the other memory (or on the other region of the memory).

The concept of the invention underlying the processing for extracting the region of interest described above can equally be applied to division of a picture.

More specifically, when the display area is divided into subareas, as illustrated in FIG. 4A, a memory having a capacity corresponding to the size of all the pictures being displayed is prepared.

When a mouse-drawn contour diagram is generated on a picture being displayed on a subarea for designating a region of interest, the mouse-drawn contour diagram is stored in the above-mentioned memory as it is and additionally displayed on the screen. Subsequently, extraction of the mouse-depicted diagram is performed. To this end, a limit range defined by the boundary line of the subarea is provided. It is then unnecessary to scan the whole display but sufficient to perform the scanning only within the subarea. Thus, by designating the boundary line simultaneously with the start of the drawing of a contour with the mouse, it is possible to perform the extraction and cut-out processing only within the designated boundary. Parenthetically, definition or establishment of the boundary line may be effected directly under the con, hand of the mouse. In the case of the embodiment of the invention described above, the scanning of a whole picture is rendered unnecessary, whereby the time involved in the scanning can be reduced significantly. Further by designating a range of the memory which corresponds to the subarea, the time taken for scanning the memory can be reduced correspondingly.

According to another embodiment of the invention, memories for storing the mouse-drawn contour are provided at a plurality of stages. In this case, even when the mouse-depicted contours or figures overlap one another on the display screen, they can be stored in the associated memories, respectively, whereby the cutting-out of region of interest can be realized correctly without exerting any influence to the other mouse-depicted figures.

It should also be mentioned that the contour of concern can be depicted not only with the mouse but also by using other types of input devices.

Further, picture scanning sequence may be started in any given one of the directions without being limited to the sequence or order described hereinbefore in conjunction with the exemplary embodiments of the invention.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

I claim:

1. A method of displaying regions of interest of a picture, said method comprising the steps of:

inputting contour line attribute data which defines boundaries for respective ones of regions of interest;

allotting said contour line attributes data for an order of designation of said regions of interest to display said regions of interest on display means;

displaying a picture on said display means;

designating regions of interest by tracing a contour of regions of interest while viewing said picture; and displaying said regions of interest with said contour line attribute to data in accordance with said order of said designation of said regions of interest.

2. A method of displaying regions of interest according to claim 1, wherein different ones of said contour line attribute data indicate different species of the lines.

3. A method of displaying regions of interest according to claim 1, wherein different ones of said contour line attribute data indicate different densities of the lines.

4. A method of displaying regions of interest according to claim 1, wherein different ones of said contour line attribute data indicate different colors of the lines.

5. An apparatus for displaying said regions of interest, comprising:

means for displaying a picture;

means for storing contour line attribute data used for displaying regions of interest;

means for receiving an input of contour data of regions of interest when a user designates said regions of interest;

means for allotting said contour line attribute data for an order of designation of said regions of interest; and means for displaying said regions of interest with said contour line attribute data in accordance with said order of said designation of said regions of interest.

6. An apparatus for displaying regions of interest according to claim 5, wherein different ones of said contour line attribute data indicate different species of the lines.

7. An apparatus for displaying regions of interest according to claim 5, wherein different ones of said contour line attribute data indicate different densities of the lines.

8. An apparatus for displaying regions of interest according to claim 5, wherein different ones of said contour line attribute data indicate different colors of said lines.

9. An apparatus for displaying regions of interest according to claim 5, wherein different ones of said contour line attribute data indicate different colors of said lines.

10. A method of displaying regions of interest of a picture, said method comprising the steps of:

inputting contour line attribute data which defines boundaries for respective ones of regions of interest;

allotting said contour line attribute data for an order of designation of said regions of interest to display said regions of interest on display means;

displaying a picture on said display means;

designating regions of interest by tracing a contour of regions of interest while viewing said picture;

displaying said regions of interest with said contour line attribute data in accordance with said order of designation of said regions of interest;

obtaining statistical data concerning said regions of interest; and displaying said statistical data according to said order of designation.

11. A method of displaying regions of interest according to claim 10, wherein different ones of said contour line attribute data indicate different species of the lines.

12. A method of displaying regions of interest according to claim 10, wherein different ones of said contour line attribute data indicate different densities of the lines.

13. A method of displaying regions of interest according to claim 10, wherein different ones of said contour line attribute data indicate different colors of the lines.

14. An apparatus for displaying regions of interest, comprising:

means for displaying a picture;

means for storing contour line attribute data used for displaying regions of interest;

means for receiving an input of contour data of regions of interest when a user designates said regions of interest;

means for allotting said contour line attribute data for an order of designation of said regions of interest;

means for displaying said regions of interest with said contour line attribute data in accordance with said order of said designation of said regions of interest;

means for obtaining statistical data concerning said regions of interest; and means for displaying said statistical data according to said order of designation.

15. An apparatus for displaying regions of interest according to claim 14, wherein different ones of said contour line attribute data indicate different species of the lines.

16. An apparatus for displaying regions of interest according to claim 14, wherein different ones of said contour line attribute data indicate different densities of the lines.

* * * * *